United States Patent Office 3,663,448
Patented May 16, 1972

3,663,448
INHIBITING SCALE DEPOSITION
Paul Hotchkiss Ralston, Pittsburgh, Pa., assignor to Calgon Corporation, Pittsburgh, Pa.
No Drawing. Continuation-in-part of application Ser. No. 597,569, Nov. 29, 1966. This application Sept. 25, 1970, Ser. No. 75,706
Int. Cl. C02b 5/06; C23f 14/02
U.S. Cl. 252—180                        9 Claims

ABSTRACT OF THE DISCLOSURE

A method of inhibiting scale formation in aqueous systems is disclosed, in which combinations of amino phosphonate compounds and water soluble polyacrylic acid derivatives are used.

RELATED APPLICATIONS

This is a continuation-in-part of my copending patent application Ser. No. 597,569, filed Nov. 29, 1966, of the same title now abandoned.

BACKGROUND OF THE INVENTION

This invention relates to methods of inhibiting scale formation and/or the formation of solid scale-forming salts in aqueous solution comprising adding to said solution small amounts of certain amino phosphonate compounds, together with a water-soluble polymer having a molecular weight from about 500 to about 12,000 selected from the group consisting of polyacrylic acid, copolymers of acrylic acid and up to 50 percent acrylamide, and polyacrylamide in which at least 50 percent of the amide groups are hydrolyzed.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale. The scale prevents effective heat transfer, interferes with fluid flow, facilitates corrosive processes, and harbors bacteria. This scale is an expensive problem in many industrial water systems, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

More than twenty-five years ago it was discovered that certain inorganic polyphosphates would prevent such precipitation when added in amounts far less than the concentrations needed for sequestering or chelating. By polyphosphates I mean phosphates having a molar ratio of metal oxide: $P_2O_5$ between 1:1 and 2:1.

When a precipitation inhibitor is present in a potentially scale-forming system at a markedly lower concentration than that required for sequestering the scale forming cation, it is said to be present in "threshold" amounts. See for example, Hatch and Rice, "Industrial Engineering Chemistry," vol. 31, page 51 at 53 (January 1939); Reitemeier and Buehrer, "Journal of Physical Chemistry," vol. 44, No. 5, page 535 at 536 (May 1940); Fink and Richardson U.S. Pat. 2,358,222; and Hatch U.S. Pat. 2,539,305.

Generally, sequestering takes place at a weight ratio of threshold active compound to scale-forming cation components of greater than about ten to one, depending on the anion components in the water. Threshold inhibition generally takes place at a weight ratio of threshold active compound to scale-forming cation components of less than about 0.5 to 1.0.

In my Pat. 3,336,221, issued Aug. 15, 1967, I have disclosed that compounds having a methyl phosphonic acid or alkali metal or ammonium salt thereof bonded to a nitrogen atom are threshold active compounds.

The present invention specifically includes the use of compounds of the general formula

where R is

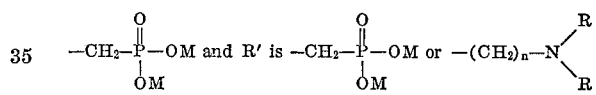

and where M is H, $NH_4$, alkali metal or combination thereof and $n$ is 1–6. I prefer to use the compounds $N[CH_2PO(OM)_2]_3$, $(CH_2)_2N_2]CH_2PO(OM)_2]_4$ or $$(CH_2)_6N_2[CH_2PO(OM)_2]_4$$

where M is H, $NH_4$, alkali metal or combination thereof. Not only are these compounds effective inhibitors at room temperatures but they are also effective at elevated temperatures. Moreover, they retain their effectiveness in acid and salt solution.

It is also well known that certain water soluble polymers including groups derived from acrylamide and acrylic acid may be used to condition water containing scale-forming compounds. See Crum U.S. Pat. 2,783,200, Salutsky U.S. Pat. 3,514,476, Ruehrwein U.S. Pat. 2,980,610, Gunderson U.S. Pat. 3,285,886, Hansen et al. U.S. Pat. 3,518,204, Booth et al. U.S. Pat. 3,463,730.

The present invention contemplates the use of polymers having the general formula

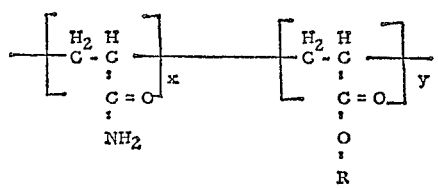

and molecular weights between about 500 and 12,000 where R is H, alkali metal or ammonium, $y$ is at least 7, and $x$ is zero or a whole number no greater than $y$. The polymers are random, linear, and water soluble. Such polymers may be hereinafter variously referred to as acrylic acid polymers and/or acrylamide/acrylic acid copolymers. They may be made by polymerizing a mixture of the desired ratio of acrylic acid and acrylamide monomers, optionally followed by conversion of some of the acrylamide component to the acid form by hydrolysis, or by polymerization of acrylamide alone, followed by hydrolysis under conditions severe enough to convert at least 50 percent of the amide groups to the acid form.

SUMMARY OF THE INVENTION

I have now found that combinations of the above described amino phosphonates and water-soluble acryle acid polymers have synergistic effects in inhibiting scale deposition in aqueous systems such as industrial waters, including oilfield waters, and brines, including sea water.

I have performed experiments at several temperatures for various lengths of time to demonstrate the effectiveness of different concentrations and forms of these combinations in inhibiting the precipitation of scale-forming salts. In these experiments, I mixed solutions of two soluble salts in the presence of the inhibitor composition to form a solution containing a relatively insoluble salt at several times its equilibrium concentration.

As a control, each experiment was also conducted in the absence of a precipitation inhibitor.

By titrating a small amount of the solution and thereby determining the concentration of one of its soluble components, the amount of precipitate formed in a particular test solution at a particular time was calculated. I used the well-known Schwarzenbach titration and determined the concentration of the alkaline earth metal cation. At the end of the experiment, the concentration of soluble cation in each control solution, as determined by titration, was considered to be 0 percent inhibition. If no precipitate formed in an inhibited test solution and it therefore contained all of its original cation content, it was considered to be 100 percent inhibited. Titration results intermediate to the 0 percent and 100 percent inhibition values were directly related to these extremes and converted to percent inhibition.

For example, the case of the scale-forming salt, calcium carbonate ($CaCO_3$), I added, with agitation, 5 ml. of 0.1 M $CaCl_2$ to a solution containing 490 ml. distilled water and 5 ml. 0.1 M $Na_2CO_3$. In the control experiment no inhibitor was present in the test solution. In other experiments, various amounts of a scale inhibitor were present prior to the addition of the calcium chloride. At the end of the storage period, the control solution contained both soluble calcium and calcium precipitated as calcium carbonate. Titration of the soluble calcium in the control solution by the familiar Schwarzenbach method indicated the concentration of calcium carbonate in solution. This calcium carbonate concentration was the equilibrium concentration under the conditions of the test (pH, temperature, ionic strength, etc.).

When a few parts per million of my scale inhibitor were present in the test described above, more calcium ion (and therefore more carbonate ion) remained in solution and less calcium carbonate precipitated at the end of the storage test. This greater concentration was confirmed by the titration of calcium in the solutions and related to the equilibrium concentration of the untreated control solution.

In the following Table I, the inhibition of deposition of calcium sulfate is demonstrated under the conditions described. The temperature was held at 130° F. throughout. Polymer A is an 85 percent active composition of 65 percent hydrolyzed polyacrylamide having a molecular weight of about 7,000; Polymer B is a 30 percent solution of polyacrylic acid having an average molecular weight of about 1,000.

TABLE I

Inhibition of Calcium Sulfate Deposition from a Solution at 2.3×equilibrium Concentration (6,900 p.p.m. $CaSO_4$) 130° F. 24 Hours Storage

| Inhibitor | Concentration (p.p.m.) | Percent scale inhibition |
|---|---|---|
| $N(CH_2PO_3)_3H_6$ | 1.2 | 20 |
| $N(CH_2PO_3)_3Na_5H$ | 1.6 | 20 |
| $N_2(CH_2)_6(CH_2PO_3)_4(NH_4)_4H_4$ | 0.3 | 11 |
| $N_2(CH_2)_6(CH_2PO_3)_4(NH_4)_4H_4$ | 0.6 | 41 |
| Polymer A | 0.6 | 4 |
| Do | 1.2 | 6 |
| Do | 2.5 | 35 |
| Polymer B | 0.6 | 0 |
| Do | 1.2 | 9 |
| Do | 2.5 | 22 |
| $N(CH_2PO_3)_3H_6$ | 1.2 } | 97 |
| Polymer A | 2.5 | |
| $N(CH_2PO_3)_3Na_5H$ | 1.6 } | 95 |
| Polymer B | 2.5 | |
| $N_2(CH_2)_6(CH_2PO_3)_4(NH_4)_4H_4$ | 0.6 } | 87 |
| Polymer A | 0.6 | |
| $N_2(CH_2)_6(CH_2PO_3)_4(NH_4)_4H_4$ | 0.3 } | 45 |
| Polymer A | 1.2 | |
| $N_2(CH_2)_6(CH_2PO_3)_4(NH_4)_4H_4$ | 0.6 } | 98 |
| Polymer A | 1.2 | |
| $N_2(CH_2)_6(CH_2PO_3)_4(NH_4)_4H_4$ | 0.6 } | 80 |
| Polymer B | 0.6 | |
| $N_2(CH_2)_6(CH_2PO_3)_4(NH_4)_4H_4$ | 0.6 } | 93 |
| Polymer B | 1.2 | |

It is apparent from the above that combinations of the amino phosphonates and polyacrylic acid or acrylamide/acrylic acid copolymers are particularly effective under the scaling conditions of the test as compared to the sum of the individual constituent.

The effectiveness of amino phosphonates and water soluble acrylic acid polymer combinations in water forming calcium carbonate scale is shown in Table II.

The synergistic effect of the combination as compared to the sum of the individual amino phosphonate and acrylic acid polymer constituents is evident.

TABLE II

Inhibition of Calcium Carbonate Deposition from a Solution at (96 p.p.m. $CaCO_3$) (3.5 ×Equilibrium Concentration )185° F. 18 hours Storage

| Inhibitor | Concentration (p.p.m.) | Percent scale inhibition |
|---|---|---|
| $N(CH_2PO_3)_3H_6$ | 0.25 | 48 |
| $N_2(CH_2)_2(CH_2PO_3)_4H_8$ | 0.25 | 41 |
| Polymer A | 0.25 | 7 |
| Polymer B | 0.25 | 4 |
| $N(CH_2PO_3)_3H_6$ | 0.25 } | 71 |
| Polymer B | 0.25 | |
| $N_2(CH_2)_2(CH_2PO_3)_4H_8$ | 0.25 } | 56 |
| Polymer A | 0.25 | |

In Table III, results of my composition as an inhibitor for calcium sulfate scale formation are illustrated. In this test, calcium sulfate at 2.3 times equilibrium concentration was held, after treatment as in the previous tests, at 150° F. for twenty-four hours. The polymer designated as Polymer C is a polyacrylate solution (33 percent active) having a pH of about 5 and an average molecular weight of 700–900.

TABLE III

Inhibition of Calcium Sulfate Deposition from a Solution (2.3× Saturation) at 150° F.—24 Hours Storage

| Inhibitor | Concentration (p.p.m.) | Percent scale inhibition |
|---|---|---|
| Polymer C | 3 | 12 |
| Do | 6 | 51 |
| Do | 3 } | 100 |
| $N(CH_2PO_3)_3H_6$ (50%) | 3 | |
| $N(CH_2PO_3)_3H_6$ (50%) | 3 | 18 |
| $N(CH_2PO_3)_3H_6$ (50%) | 6 | 61 |

My invention contemplates the use of compositions containing methylene phosphonate groups and acrylic acid polymers in ratios of one part phosphonate compound to from ½ part to 5 parts polymer, i.e., 1:0.5 to about 1:5.0.

Although my invention is particularly advantageous at temperatures above 100° F., it may be useful at lower or ambient temperatures. It is effective in concentrations of the total composition as low as 0.1 p.p.m. against any scale-forming alkaline earth metal salts such as carbonates, sulfates, oxalates, phosphates, fluorides and silicates. I prefer to use no more than about 25 parts per million of my composition, i.e., 25 p.p.m. will almost always suffice, but any threshold amount up to about 100 parts per million will also be advantageous.

I do not intend to be limited to the above specific examples and illustrations of my invention. It may be otherwise practiced within the scope of the following claims.

I claim:

1. Composition useful for inhibiting the deposition of alkaline earth metal scale from water containing scale-forming constituents comprising (a) about one part by weight of a compound of the formula

where R is

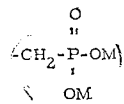

and R' is

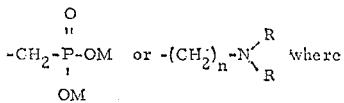

where M is H, $NH_4$, alkali metal or combination thereof, and $n$ is 1–6, and (b) from ½ part to about 5 parts of a random, linear water soluble acrylic acid polymer of the general formula

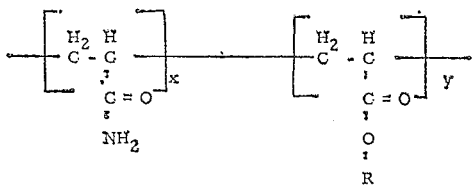

having a molecular weight of from 500 to 12,000, where R is H, alkali metal or ammonium, $y$ is at least 7, and $x$ is zero or a whole number no greater than $y$.

2. Method of inhibiting the deposition of scale in aqueous systems comprising adding thereto at least about 0.1 p.p.m. of a composition of claim 1.

3. Method of claim 2 in which the composition of claim 1 is added in amounts no greater than about 25 p.p.m.

4. Composition of claim 1 in which the compound of the formula

is a sodium amino tris (methylene phosphonate).

5. Method of inhibiting the deposition of insoluble scale from water containing scale-forming salts comprising adding to said water up to about 100 p.p.m. of a threshold composition of claim 1.

6. Method of claim 5 in which the amino methylene phosphonate compound is sodium amino tris (methylene phosphonate).

7. Method of inhibiting the deposition of scale-forming salts on surfaces in contact with an aqueous system at temperatures above 100° F. comprising maintaining in said aqueous system at least about 0.1 p.p.m. of a composition of claim 1.

8. Method of claim 7 in which the composition of claim 1 is maintained in the system in amounts no greater than 100 p.p.m.

9. Method of claim 7 in which the composition of claim 1 is maintained in the system in amounts no greater than 25 p.p.m.

References Cited

UNITED STATES PATENTS

| | | | |
|---|---|---|---|
| 3,505,238 | 4/1970 | Liddell | 252—180 |
| 2,980,610 | 4/1961 | Ruehrwein | 210—58 |
| 3,336,221 | 8/1967 | Ralston | 252—180 |
| 3,393,150 | 7/1968 | Ralston | 252—180 |
| 3,451,939 | 6/1969 | Ralston | 252—181 |
| 2,783,200 | 2/1957 | Crum | 210—23 |
| 3,331,773 | 7/1967 | Gunderson | 210—58 |
| 3,418,237 | 12/1968 | Booth | 210—54 |
| 3,524,811 | 8/1970 | Tsuk | 252—181 X |
| 3,549,548 | 12/1970 | Newman | 252—181 X |

ROBERT F. BURNETT, Primary Examiner

M. E. McCAMISH, Assistant Examiner

U.S. Cl. X.R.

21—2.7; 210—58; 252—8.55 B, 175

UNITED STATES PATENT OFFICE
CERTIFICATE OF CORRECTION

Patent No. 3,663,448      Dated May 16, 1972

Inventor(s) Paul Hotchkiss Ralston

It is certified that error appears in the above-identified patent and that said Letters Patent are hereby corrected as shown below:

Col. 3, line 16, "acryle" should read -- acrylic --; line 45, after "example" insert -- in --; column 4, line 2, "qui-" should read -- equi- --; col. 5, line 30, in the formula, delete "where", first occurrence.

Signed and sealed this 27th day of March 1973.

(SEAL)
Attest:

EDWARD M. FLETCHER, JR.
Attesting Officer

ROBERT GOTTSCHALK
Commissioner of Patents